(12) United States Patent
Mattison

(10) Patent No.: US 6,615,355 B2
(45) Date of Patent: *Sep. 2, 2003

(54) METHOD AND APPARATUS FOR PROTECTING FLASH MEMORY

(75) Inventor: Phillip E. Mattison, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/033,850

(22) Filed: Dec. 19, 2001

(65) Prior Publication Data

US 2002/0065978 A1 May 30, 2002

Related U.S. Application Data

(63) Continuation of application No. 08/673,301, filed on Jun. 28, 1996, now Pat. No. 5,778,070.

(51) Int. Cl.[7] .............................................. G06F 12/14
(52) U.S. Cl. ...................................... 713/193; 713/189
(58) Field of Search .............................. 713/176, 189, 713/190, 200, 193

(56) References Cited

U.S. PATENT DOCUMENTS

| | | | | |
|---|---|---|---|---|
| 5,421,006 A | * | 5/1995 | Jablon et al. ................. | 714/36 |
| 5,442,704 A | * | 8/1995 | Holtey ........................ | 711/163 |
| 5,465,299 A | * | 11/1995 | Matsumoto et al. ........ | 713/176 |
| 5,568,641 A | * | 10/1996 | Nelson et al. .................. | 713/2 |
| 5,675,645 A | * | 10/1997 | Schwartz et al. ........... | 713/187 |
| 5,727,061 A | * | 3/1998 | Johnson et al. ............. | 713/165 |
| 5,748,940 A | * | 5/1998 | Angelo et al. .............. | 711/163 |
| 5,757,915 A | * | 5/1998 | Aucsmith et al. ........... | 713/187 |
| 5,778,070 A | * | 7/1998 | Mattison ..................... | 713/191 |
| 5,933,498 A | * | 8/1999 | Schneck et al. .............. | 705/54 |
| 5,999,628 A | * | 12/1999 | Chan ........................... | 380/30 |

\* cited by examiner

*Primary Examiner*—Gilberto Barrón
*Assistant Examiner*—Kambiz Zand
(74) *Attorney, Agent, or Firm*—Blakely, Sokoloff, Taylor & Zafman LLP

(57) ABSTRACT

In a computer system having a processor, a system memory, a flash memory, and a memory controller, a method comprising the steps of loading a flash memory upgrade program containing a new flash memory image and a digital signature into a portion of the system memory; configuring the memory controller to limit the processor to accessing only the flash memory and the portion of the system memory; verifying the flash memory update program using the digital signature; and, updating the flash memory only if the flash memory upgrade program is authentic.

7 Claims, 3 Drawing Sheets

METHOD AND APPARATUS FOR PROTECTING FLASH MEMORY

This application is a continuation of application Ser. No. 08/673,301, filed Jun. 28, 1996, now U.S. Pat. No. 5,778,070.

BACKGROUND OF THE INVENTION

1. Field of the Invention

The present invention relates to the field of use of protecting flash memory from unintended or unauthorized modification. More particularly, the present invention relates to providing modification protection for code contained in flash memory, such as a Basic Input/Output System program (BIOS).

2. Description of Related Art

Currently, when a PC is first initialized or reset, it begins executing a basic Input/Output System program (BIOS) at a predefined location. The BIOS first performs a Power On Self Test (POST), in which all the system hardware units (such as the interrupt controller, the Direct Memory Access (DMA) controller, and timers/counters) are tested and programmed for normal operation. After the POST is complete, the BIOS scans another predefined memory region for BIOS extension software.

BIOS extension software may be included on hardware expansion plug-in cards. Typically, graphics adapter cards, local area network (LAN) adapter cards, and other hardware expansion plug-in cards have BIOS extension software. BIOS extension software allows the expansion hardware to map its own interrupt service programs into the BIOS function set, thereby adapting the function set to use the custom hardware.

The BIOS function set is defined in terms of software interrupts, meaning the BIOS and any BIOS expansion software must modify the interrupt vector table (BIOS software is written assuming the processor is running in real mode). Programs use the BIOS function set by generating software interrupts, which find the address of a particular BIOS function in the interrupt vector table and transfers control to the interrupt service program.

A common procedure followed by DOS programs is to modify the interrupt vector table to intercept BIOS calls (or other interrupts such as keyboard inputs), examine or process any relevant data, and then pass along control of the processor to the original target BIOS program. For example, when a key is pressed on a keyboard, a hardware interrupt is generated which causes the BIOS to get the relevant data from the keyboard interface, translate the data as necessary, and store it in a queue. Later, a program can generate a software interrupt that requests the BIOS to provide the next key input from the keyboard.

Because the BIOS is the first program to gain control of the processor after reset, it is critical to any security scheme. Therefore, the BIOS must be protected from modification during any time where the machine is in an unsecured operating mode, especially in cases where the BIOS is stored in flash memory. The BIOS is stored in flash memory to allow for field updates and reprogramming of the BIOS.

Typically, access to the BIOS is controlled by a system controller chip or chip set. The system controller incorporates all standard PC architecture functions such as interrupt controllers, DMA controllers, and memory controllers. This access control includes a reprogramming function for modifying the flash memory as well as functions for accessing the flash memory for execution of the program contained within the BIOS.

A common approach presently used to prevent unintentional modification of a flash memory is to use a register interlock scheme where two or more registers must be written with specific values in a specific sequence to enable the reprogramming of the flash memory. An example of the current flash memory protection scheme is illustrated in FIG. 1, where a register A 2, a first key 4, a first comparator 6, a register B 8, a second key 10, a second comparator 14, and an AND gate 12. Register A 2 receives data from data path 16 when it receives a "write enable" signal on write line 18. The value of register A 2 is compared to the value of first key 4 by comparator 6. Comparator 6 generates a write enable signal to AND gate 12 if the value of register A 2 is equal to the value of first key 4. Similarly, comparator 14 compares the value contained in register B 8 and second key 10 and generates a "BIOS write enable" signal on signal line 20 if the value contained in register B is equal to the value contained in second key 10.

Normally, after reset of the system containing the register interlock of FIG. 1, register A 2 and register B 8 contain the value of zero. In addition, register B 8 is inaccessible to receive a value as comparator 6 outputs a logical zero to AND gate 12 as the value contained in register A 2 (i.e., zero) is not equal to the value contained in key 4 (i.e., hexadecimal number "0x00AA55FF"). To enable flash erasure and programming, register B 8 must contain a value of "0xFF55AA00". To enable access to register B 8, register A 2 must contain a value of "0x00AA55FF", as shown in FIG. 1.

Thus, to enable the reprogramming of the flash BIOS program in flash memory, register A 2 is first loaded with the value of "0x00AA55FF" through the use of data path 16 and write signal line 18. When register A 2 has been so configured, comparator 6 will output the "write enable" signal to AND gate 12 which will allow a subsequent write signal on write signal line 18 to configure register B 8 with the value of "0xFF55AA00" through the use of data path 16. When register B 8 has been so configured, comparator 14 will output a "BIOS write enable" signal over signal line 20 to allow the access of the flash memory (not shown) for reprogramming.

Although the scheme of writing two specific values in a specific sequence into two specific register locations reduces the probability of accidental erasure, the scheme does not prohibit intentional or mischievous erasure or reprogramming of the flash memory because the access sequence must be published in some form by the hardware developer for use by third-party BIOS program developers.

Therefore, what is needed is a protection scheme which would allow only authorized individuals to modify the flash memory. In addition, this protection scheme must allow for the protection of the flash memory without the need to provide hardware which is unique to each machine that is to be protected.

SUMMARY OF THE INVENTION

To provide for the protection of flash memory containing a program such as a Basic Input/Output System from any unauthorized reprogramming efforts, a system memory controller is included which provides a mode where the processor is restricted to accessing only the flash memory (i.e., a mode where the processor can only execute instructions from the flash memory and not from any other memory such as a main system memory or cache) This mode can be enabled or disabled by setting or clearing a control register of the system memory controller. The default mode after reset of the system would be to restrict instruction execution to the program in flash memory.

In addition, the memory controller should incorporate a set of registers that can be used to define limited regions of accessibility to memory space outside flash memory (i.e., regions in main system memory). These registers would be accessible to the processor only when the controller is operating in the restricted access mode (i.e., when the processor is executing instructions only from the flash memory). The register set will consist of one or more pairs of registers, wherein each pair would consist of a Base register and a Limit register. The Base and Limit registers would define a memory region beyond the flash memory which would be accessible to the processor when the system is operating in the restricted mode. The default value after reset would be 0 (i.e., after reset, no "extended" memory access is allowed in restricted mode).

In addition, a flash memory programming register is used to enable erasure and reprogramming of flash memory. The flash memory programming register is interlocked to enable those functions only when the memory controller is operating in the restricted mode.

To reprogram a flash memory, the following procedure would be used:

1. A flash memory upgrade program containing a new flash memory image for the flash memory would be loaded into main system memory and executed. The flash memory upgrade program would incorporate a digital signature which was "signed" by the private key of the vendor; the digital signature being the original hash value of the flash memory upgrade program encrypted with the vendor's private key.
2. The flash memory upgrade program would call a special function in the current program contained in the flash memory, requesting to install the new flash memory image. This call would specify the address and size of the flash memory upgrade program located in main system memory.
3. The current program would set the memory controller to operate in a restricted mode, and enable extended memory access to the portion of the system memory containing the flash memory upgrade program.
4. The current program would then verify the source and content of the flash memory upgrade program (which includes the new flash memory image) by: (a) decrypting the digital signature using the vendor's public key stored in the current program to obtain the original hash value; (b) independently calculating a hash value for the flash memory upgrade program which is resident in main system memory; and (c) comparing the original hash value obtained from decrypting the digital signature with the independently generated hash value to find a match.
5. If the hash values match, indicating that the flash memory upgrade program contained in main memory originated from the authorized creator AND has not been modified, then the current program contained in the flash memory would enable reprogramming of the flash memory and return control of the processor to the flash memory upgrade program.
6. The flash memory upgrade program would then erase the flash memory and copy the new flash memory image into the flash memory. The new program code would contain the same special functions as the current program to allow future field upgrades, and also include a copy of the public key of the vendor. In addition, in another preferred embodiment, each subsequent version of the flash memory upgrade program can contain an updated or different key. In this other preferred embodiment, where each different version of the update program has a different key, there would be required multiple signatures, one for each key that has been previously used, to ensure that any previous version of the program can be updated without going through all revisions in between. Moreover, each update program would contain all previous keys, to ensure that the flash memory can also be "downgraded" to a previous version of the program code.
7. The flash memory upgrade program, still executing from main system memory, would then transfer control of the processor to the program contained in the new flash memory image, now in flash memory, which in turn would return the memory controller to normal operation and begin its normal initialization sequence as if a reset had occurred.

The provided security scheme would not require the system to initialize in a secure mode and could be implemented after a normal initialization procedure of the system. Thus, upon reset of the system, the program located in flash memory (such as the BIOS) would gain control of the processor, set the memory controller to allow unrestricted access to the system memory, and proceed as normal. When it is desired that the program in the flash memory should be updated, execution would begin with Step 1, as indicated above, and not require that the processor or system be placed in a special mode before execution of the flash memory upgrade program.

Through the use of the above protection scheme, only the holders of the vendor's private key could distribute software to modify the current program. The ability to disable unused memory during the flash reprogramming process prevents any code that has not been cryptographically verified from getting control of the system. In addition, extensions to the current program, which is not contained in the flash memory or the authorized memory space, would not be allowed to execute and would thus prevent "rogue" programs contained in an extension from unauthorized modification of the flash memory. The only way to subvert the security process is by altering the operation of the hardware or compromising the vendor's private key. The fundamental integrity of the original code itself and any updates can be insured by economic and administrative means and therefore should not require any hardware support which is unique to each machine.

This invention also does not depend on the BIOS having to take control from the beginning of the boot-up process to ensure thwart unauthorized modification.

This approach to protecting sensitive registers in devices is not only used for enabling flash programming, but also for other applications where an accidental modification of a hardware register could result in serious consequences.

Other objects, features and advantages of the invention will be apparent from the accompanying drawings, and from the detailed description that follows below.

DETAILED DESCRIPTION OF THE INVENTION

The present invention provides a method and apparatus for preventing unauthorized modification of flash memory. For purposes of explanation, specific embodiments are set forth to provide a thorough understanding of the present invention. However, it will be understood by one skilled in the art, from reading this disclosure, that the invention may be practiced without these details. Further, although the present invention is described through the use of flash memory, most, if not all, aspects of the invention apply to memory in general. Moreover, well-known elements, devices, process steps and the like are not set forth in detail in order to avoid obscuring the present invention.

In addition, references will be made to encryption schemes such as the Rivest, Shamir, and Adleman (RSA) public-key cryptographic system, which can be used for both encryption and digital signatures. However, any cryptographic system which allows for the authentication of the source and content message can be used without deviating from the spirit and scope of the invention. In essence, the public key cryptography as used a secure system to verify the source and content of secure software and to protect keys used in bulk cryptography.

Reference is also made to one other technique called "hashing." This is similar to a checksum operation, but mathematically more rigorous, reducing the possibility of the same checksum on two different blocks of data to negligible proportions. Hashing is an element in the key and verification and the signature. A hash value will be a number that is unique to a block of information so that if any part of the information is modified in that block of information, a subsequently generated hash value will be different. Whether a checksum or hash operation is used, and physically which hash algorithm is used, is not relevant to the invention described here. Such decisions are intended to be left to the implementors of whatever secure software system operate on the secure platform.

A "signature" is generated for a block of information by a sender generating a hash value using the data in the block of information and then encrypting the generated hash value with the sender's private key. Thus, the encrypted hash value is the signature of the vendor for that block of information.

To validate that the block of information originated from the vendor and also to determine that no change has been made to the block of information, the recipient first generates a hash value over the block of information, and then decrypts the signature using the vendor's public key to obtain the hash that was originally generated. If the hash value generated by the recipient matches the decrypted hash value distilled from the signature attached the block of information, then the received block of information can be relied on as originating from the vendor and received without change.

Figure 1:
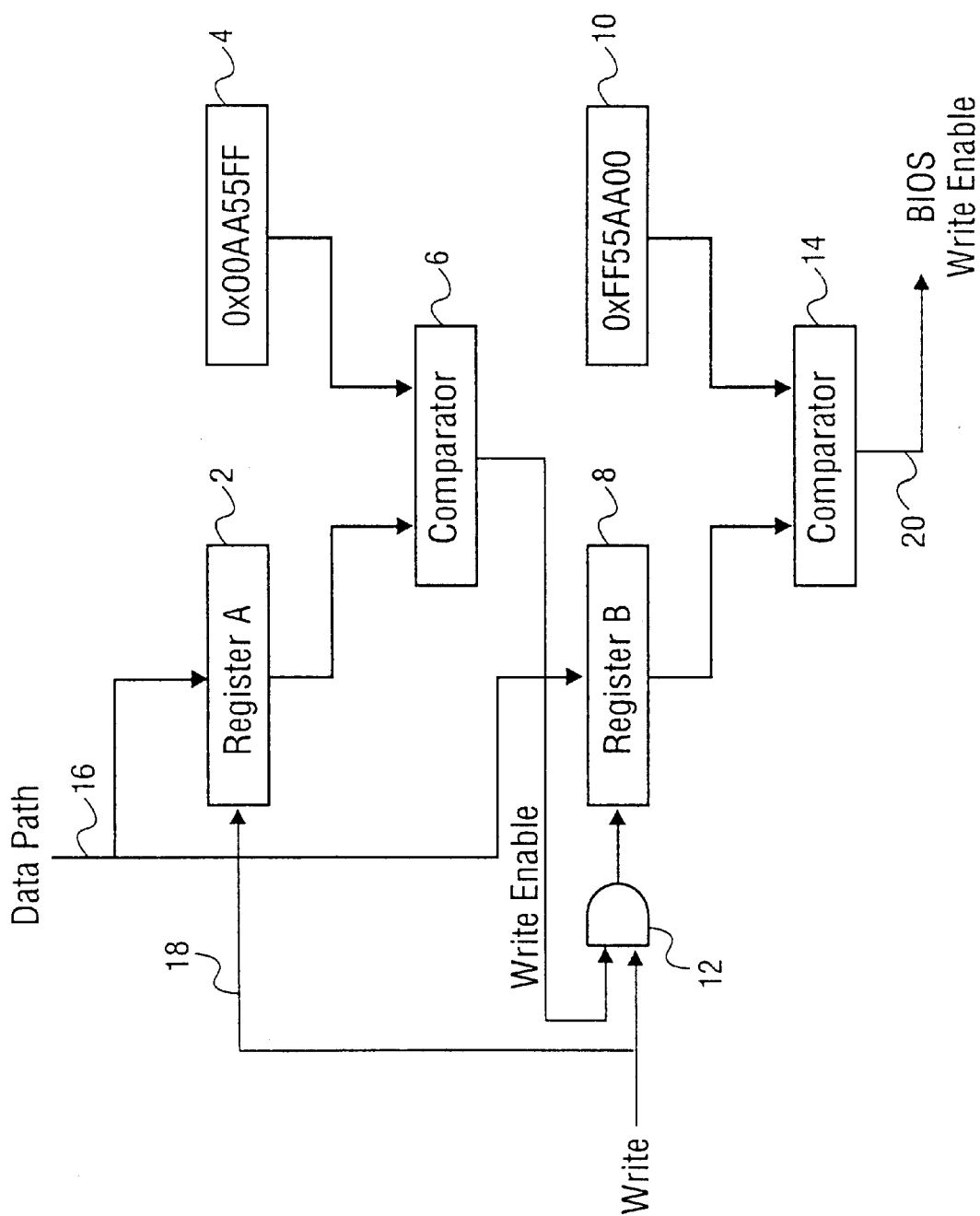
FIG. 1 illustrates a prior art register interlock for preventing modification to a BIOS.
Figure 2:
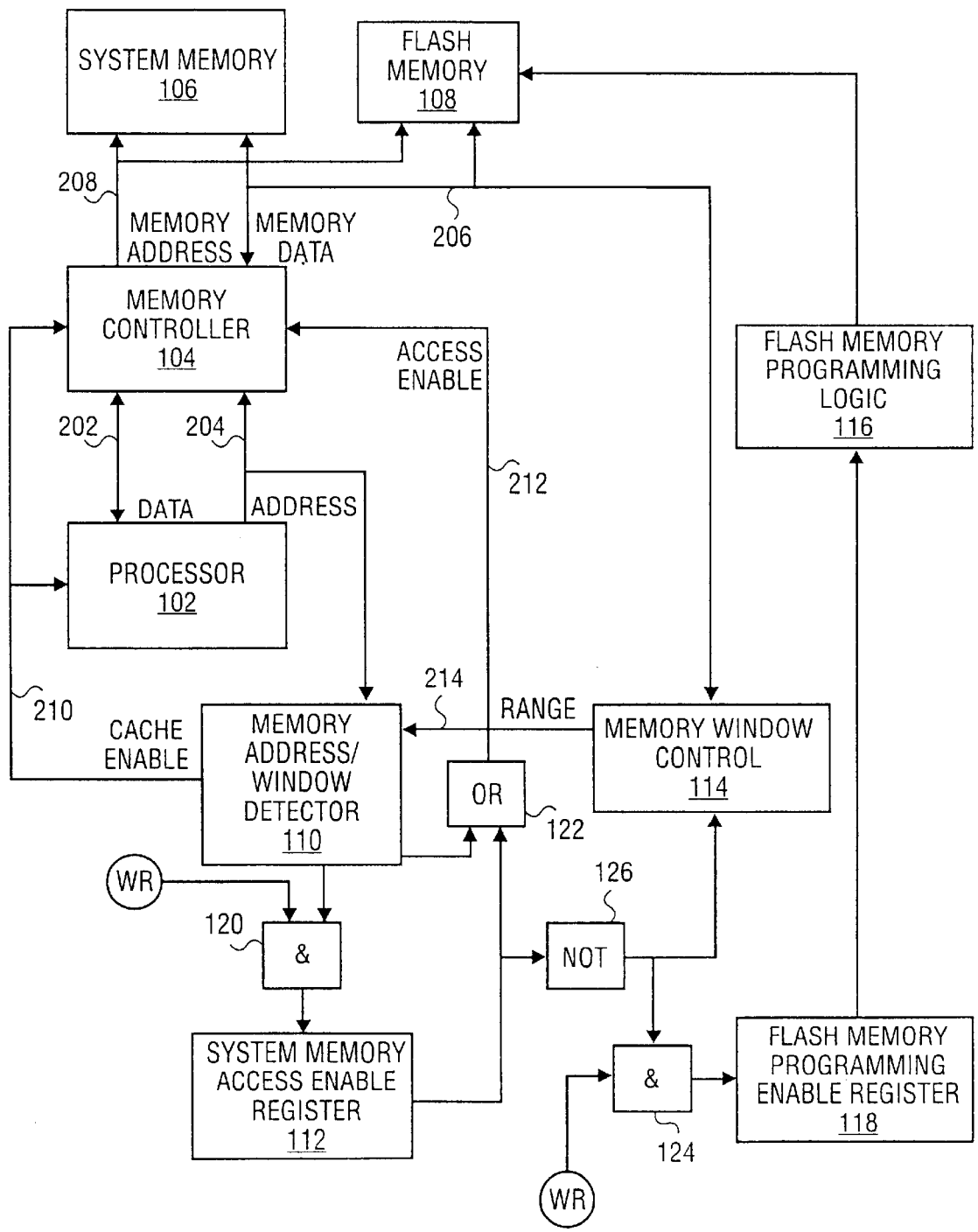
FIG. 2 illustrates a system configured in accordance to a preferred embodiment of the invention.

FIG. 2 illustrates a system configured in accordance with a preferred embodiment of the present invention, including: a processor 102, a memory controller 104, a system memory 106, a flash memory 108, an memory address/window detector 110, a system memory access enable register 112, a memory window control 114, a flash memory programming logic 116, a flash memory programming enable register 118, a first AND-gate 120, an OR-gate 122, a second AND-gate 124, and a NOT-gate 126.

As illustrated in FIG. 2, processor 102 is coupled to memory controller 104 through a data signal line 202 and an address signal line 204. Memory controller 104 is coupled to system memory controller 106 through the use of a memory data signal line 206 and a memory address signal line 208. Memory controller 104 is also coupled to flash memory 108 through the use of memory data signal line 206 and memory address signal line 208. Memory window control 114 is also coupled to memory data signal line 206. Memory window control 114 also provides an output over range signal line 214 to memory address/window detector 110.

Memory controller 104 and processor 102 is coupled to memory address/window detector 110 through the use of a cache enable signal line 210 and address signal line 204. Memory address/window detector 110 is also coupled to first AND-gate 120, the output of which is coupled to system memory access enable register 112, to control the writing of values into system memory access enable register 112. The output of system memory access enable register 112 and an access enable output from memory address/window detector 110 is fed through OR-gate 122 and is received by memory controller 104 through the use of an access enable signal line 212. The output of system memory access enable register is also fed into NOT-gate 126.

The output of NOT-gate 126 is fed into memory window controller 114 and second AND-gate 124, respectively. The output of second AND-gate 124 is fed into flash memory programming enable register 118, the output of which is also connected to flash memory programming logic 116. Flash memory programming logic 116 is coupled to flash memory 108.

Memory controller 104 translates the addresses in the address space used by processor 102 into whatever addresses are needed by the other system components. Thus, for example, whether processor 102 is trying to execute instructions or access data from flash memory 108 or system memory 106, all data and commands will go through memory controller 104. Memory controller 104 can prevent processor 102 from accessing system memory 106 by not translating the requests pertaining to the address space used to access system memory 106. Memory controller 104 is capable of operating in a mode that does not cache anything. In the preferred embodiment, memory controller 104 will allow access to system memory 106 while it is receiving an access enabled signal over access enable signal line 212. Further, memory controller 104 has a mode where access to an off-processor cache (a level 2 cache) will not be processed. This mode is controlled by memory address/window detector 110, as described below.

System memory access enable register 112 is used to generate the access enabled signal over access enable signal line 212 during normal operations. By modifying system memory access enable register 112, access to system memory 106 is either enabled or disabled—i.e. all requests to access system memory 106 is controlled by the value contained in system memory access enable register 112. However, access to system memory 106 can be allowed, regardless of the value contained in system memory access enable register 112, by memory address/window detector 110, as described below.

In a preferred embodiment, system memory access enable register 112 contains a single bit and can be implemented as a flip-flop. When system memory access enable register 112 contains a logical value of "0", memory controller 104 will not allow processor 102 to access system memory 106 unless memory address/window detector 110 generates a logical "1" to OR-gate 122 to provide a logical value of "1" to memory controller 104 over access enable signal line 212. Thus, in the preferred embodiment, the access enabled signal is represented by a logical value of "1".

In the preferred embodiment, on startup, such as when there is a hardware reset, system memory access enable register 112 is disabled—i.e., system memory access enable register 112 contains a logical "0", thus disabling access to system memory 106. Thus, only the BIOS program in flash memory 108 can be accessed for execution. During the system initialization process, the reset vector goes in and starts executing in the BIOS, one of the first things it would do is write into system memory access enable register 112 to enable all accesses to system memory 106.

Memory address/window detector 110, which has the ability to monitor the addresses accessed by processor 102 through the use of address signal line 204, provides that only a program running within flash memory 108 can modify system memory access enable register 112 to allow memory controller 104 to provide access to system memory 106. Thus, a program operating in system memory 106 could not modify system memory access enable register 112 as memory address/window detector 110 will only allow access to system memory access enable register 112 if it detects that processor 102 is executing from the program contained in flash memory 108.

Memory address/window detector 110 operates based on the fact that in a linear address map, typically the upper 64 kilobytes in the first megabyte of the original PC architecture is allocated for BIOS and any extensions to the BIOS is contained in a region below the 64 kilobytes allocated to the BIOS, along with any other "program memory". Thus, the BIOS extensions for interrupt controllers and other programs and data are in a different memory range from the program contained in flash memory 108. If a machine is truly PC compatible, then the address ranges from which the BIOS will be executing are known.

In addition, as described above, memory address/window detector 110 can "override" the disabling of access of system memory 106 by system memory access enable register 112 through the use of generating a signal with a logical value of "1" to OR gate 122. Memory address/window detector 110 will override the disabling of access of system memory 106 for the addresses contained in memory window control 114, as described below.

Further, memory address/window detector 110 can disable a cache either local to processor 102 (a level 1 cache) or an off-processor cache (a level 2 cache) through the generation of a cache disable signal over cache enable signal line 210 to processor 102 and memory controller 104, respectively.

Thus, memory address/window detector 110 can send a control signal that enables caching on memory controller 104 and processor 102, and memory address/window detector 110 can also send out an enable signal that enables a write signal to pass through to system memory access enable register 112. Memory address/window detector 110 can monitor addresses to detect when the CPU is executing in the appropriate range.

Memory window control 114 opens up a range of "valid" memory addresses where processor 102 can access the update program by memory address/window detector 110 sending out the access enable signal that re-enables memory controller 104 to provide access to system memory 106 during certain points. In a preferred embodiment, memory window control 114 contains a base register (not shown) and a limit register (not shown) Memory window control 114 is only accessible only when the system memory access enable register 112 is set to the disabled state.

Figure 3:
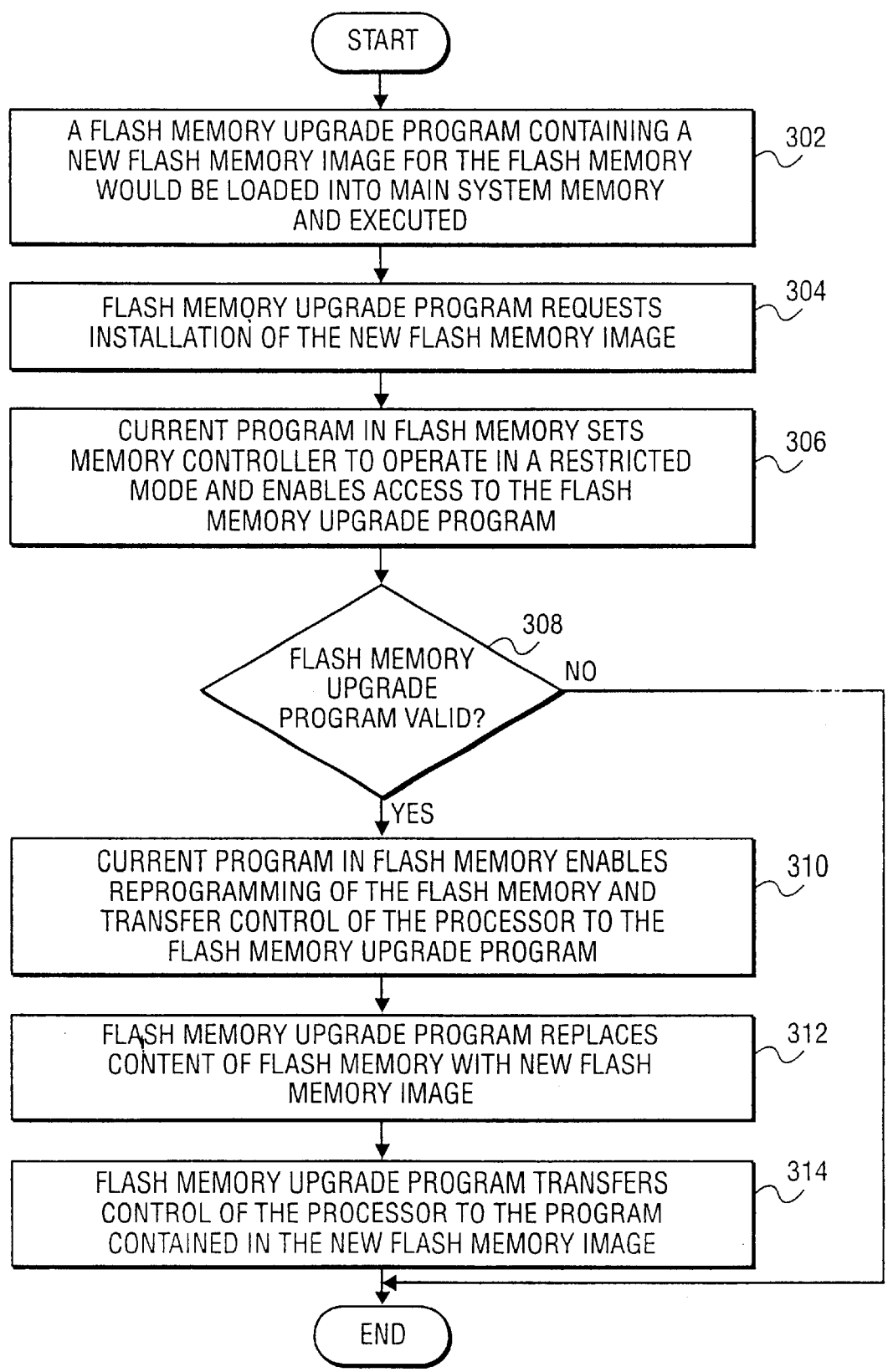
FIG. 3 illustrates a flow diagram containing a preferred operation of the invention.

FIG. 3 illustrates a series of operations for reprogramming flash memory 108 in accordance with the present invention.

In block 302, a flash memory upgrade program containing a new flash memory image (e.g., a new BIOS image) for flash memory 108 (containing the current BIOS) would be loaded into system memory 106 and executed. The flash memory upgrade program would incorporate a digital signature which is "signed" by the private key of the vendor; the digital signature being the original hash value of the flash memory upgrade program after the original hash value has been encrypted with the vendor's private key. Operation would then continue with block 304.

In block 304, after the flash memory upgrade program begins execution, the flash memory upgrade program would call a special function in the current program contained in flash memory 108, requesting to install the new flash memory image. This call would specify the address and size of the flash memory upgrade program located in system memory 106. Therefore, when the flash memory upgrade program (containing the new BIOS image) begins execution, it transfers control to the program contained in flash memory 108 (the current BIOS), requesting to update the current BIOS.

The address and size of the flash memory upgrade program would be stored into the base register and the limit register, respectively, contained in memory window control 114. As mentioned above, memory window control 114 can contain more than one pair of the base register and the limit register to provide for situations where the flash memory upgrade program is not contained in one contiguous address space.

In block 306, after processor begins operating according to the current program contained in flash memory 108, memory address/window detector 110 first disables caching by processor 102 and memory controller 104 by sending out a cache disable signal over cache enable signal line 210. It is to be noted that caches do not necessarily have to be disabled during ALL phases of the update. Caches just have to be flushed (i.e., cleared of all data and instructions) until after the flash memory upgrade program (and the enclosed new flash memory image) is authenticated.

Processor 102 fetches an instruction from the program in flash memory 108 (e.g. the BIOS), and that instruction is a register I/O write instruction. The BIOS wants to write to system memory access enable register 112 to disable access to system memory 106. When the write instruction is sent on a bus write cycle, memory address/window detector 110 determines that the previous instruction fetch that precipitated the register I/O write instruction was from within the BIOS (in flash memory), and memory address/window detector 110 allows the register I/O write instruction to complete as the register I/O write instruction came from the BIOS.

If processor 102 is executing a program contained in system memory 106 and issued a register I/O write instruction to modify system memory access enable register 112, the bus write cycle for the register I/O write instruction would be blocked as memory address/window detector 110 determines that the register I/O write instruction precipitated from processor 102 executing from the program contained in system memory 106. Therefore, only the program contained in flash memory 108 can modify the state of system memory access enable register 112.

Also, as memory address/window detector 110 senses that processor 102 is executing from a physical address space in flash memory 108—i.e., processor 102 is executing code from the current BIOS, memory address/window detector 110 generates a signal representing a logical "one" to first AND gate 120 to allow system memory access enable register 112 to be disabled by writing a signal with a value of logical value of "0" to system memory access enable register 112. As system memory access enable register 112 contains a logical value of "0", the output of OR gate 122 will be a logical value of "0" unless memory address/window detector 110 outputs a signal with a logical value of "1"—i.e., access to system memory 106 will only be allowed if memory address/window detector 110 outputs a logical value of "1" to OR gate 122.

As mentioned above, memory window control 114 contains registers which define a set of accessible address spaces in system memory 106 after system memory 106 has been "locked down." Memory address/window detector 110 will allow access to a portion of system memory 106 defined by memory window control 114, "overriding" the total ban on accessing system memory 106 caused by the setting of system memory access enable register 112, by reading the registers contained in memory window control 114. When processor 102 requests to fetch data or instruction from this set of accessible address spaces, memory address/window detector 110 sends out an access enable override to allow accesses to the accessible address spaces even though system memory access enable register 112 has otherwise "locked down" system memory 106. Specifically, memory address/window detector 110 will only allow memory controller 104 to provide access to system memory 106—i.e., memory address/window detector 110 will only output a signal over access enable signal line 212 with a logical value of "1" to memory controller 104, if the access requested is within the address space defined by the registers in memory window control 114.

Thus, the current program in flash memory 108 would first place memory controller 104 to operate in a "restricted" rode, which disables system memory 106, so processor 102 cannot access anything in system memory 106. Then, the current program in flash memory 108 would enable extended memory access to the portion of the system memory containing the flash memory upgrade program.

In block 308, the current program in flash memory 108 would then verify the source and content of the flash memory upgrade program (which includes the new flash memory image) by: (a) decrypting the digital signature using the vendor's public key stored in the current program to obtain the original hash value; (b) independently calculating a hash value for the flash memory upgrade program which is resident in main system memory; and (c) comparing the original hash value obtained from decrypting the digital signature with the independently generated hash value to find a match.

If the hash values match, indicating that the flash memory upgrade program contained in main memory originated from the authorized creator AND has not been modified, then operation will continue with block 310. If the hash value does not match, the upgrade will be aborted. In an alternate embodiment, the user can be notified of the failed upgrade in another step (not shown).

In block 310, the current program contained in flash memory 108 would enable reprogramming of flash memory 108 by setting flash memory programming enable register 118 with a programming enable signal and transfer control of processor 102 to the flash memory upgrade program contained in system-memory 106 at a predefined entry point. As described above, as long as system memory access enable register 112 is in the enabled state, it has an interlock back to flash memory programming enable register that will not allow reprogramming of flash memory 108. To set system memory access enable register 112 to the disabled state, which enables access to flash memory programming enable register, it is required that processor 102 be executing the original authorized program (e.g., the BIOS) contained in flash memory 108. In this system, only the original program in flash memory 108 can authorize itself to be replaced.

In block 312, through the use of flash memory program logic 116, the flash memory upgrade program erases flash memory 108 and copy the new flash memory image into flash memory 108. The new program code would contain the same special functions as the current program, including a copy of the public key of the vendor, to support future field upgrades. Operation will then continue with block 314.

In block 314, the flash memory upgrade program, still executing from system memory 106, transfers control of processor 102 to the program contained in the new flash memory image, now in flash memory 108, which in turn would return memory controller 104 to normal operation and begin its normal initialization sequence as if a reset had occurred. The update operation would then end.

In normal operation, the program in flash memory 108 (e.g., the BIOS) gets control immediately after a hardware reset. The BIOS then initializes all the hardware and then loads the operating system before transfering control to the operating system. The present invention functions according to the normal situation by being able to start up in a non-secure mode of operation, and then switch into a secure operating mode in order to update the BIOS and then go back and re-initialize and start over. Therefore, the protection scheme does not require the system to come up initially in a secure mode.

Although the flash memory update program starts the whole flash memory update function, the real key to the security in the system is to ensure that only when processor 102 is executing instructions from flash memory 108 is it possible to change into a secure operating mode—i.e., only when processor 102 is executing instructions from flash memory 108 is it possible to modify system memory access enable register 112.

In addition, the system protects against circumvention attempts where a rogue interrupt is added to the BIOS extension, because by enforcing that processor 102 can only be executing from the particular physical range of memory that is occupied by the authorized flash memory programs, no other software can have access to the registers that control the ability to make that update.

It is also to be appreciated that although in the preferred embodiment, key checking is done "strictly" in software—i.e. the decryption of the signature and the independent generation of the bash value for the update program is performed through the use of processor 102 executing code from flash memory 108, it is to be appreciated that decryption and comparison of the hash value can be performed through the use of other methods, including an application specific integrated circuit.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A replacement method, comprising:

storing instructions in a non-volatile memory to execute a program to install a replacement Basic Input/Output System (BIOS) program;

storing the replacement BIOS program in a system memory of a processor, the replacement BIOS program incorporating a digital signature;

using the BIOS program to set a memory controller to operate in a restricted mode and enable access to a portion of the system memory containing the replacement BIOS program; and operating the BIOS program in the processor to authenticate the replacement BIOS program as a new authorized BIOS program and specify a size of the new authorized BIOS program to be written into the non-volatile memory.

2. The replacement method of claim 1, wherein the replacement BIOS program calls the instructions stored in the non-volatile memory to request an install of the replacement BIOS program in the system memory to the non-volatile memory following authentication of the replacement BIOS program.

3. The replacement method of claim 2, further comprising operating the processor with the replacement BIOS program.

4. A method, comprising:

running a current program of a computer from a nonvolatile memory;

loading a memory upgrade program into a main system memory, where the current program verifies content of the upgrade program and sets a memory controller to operate in a restricted mode to enable reprogramming the nonvolatile memory with the memory upgrade program; and using the memory upgrade program to erase the nonvolatile memory and copy the memory upgrade program from the main system memory into the nonvolatile memory.

5. The method of claim 4, further comprising restricting the memory upgrade program to an address space in the main system memory that is defined by values stored in a first and second register of the computer.

6. The method of claim 5, further comprising restricting the computer to execute instructions stored in the memory upgrade program after authenticating a digital signature.

7. The method of claim 4, wherein running a current program of a computer from a nonvolatile memory further includes accessing a flash memory.

* * * * *